United States Patent [19]
Sadr

[11] Patent Number: 5,225,137
[45] Date of Patent: Jul. 6, 1993

[54] BOTTLE RECYCLING APPARATUS AND METHOD

[75] Inventor: Changize Sadr, Toronto, Canada

[73] Assignee: ABC Group, Rexdale, Canada

[21] Appl. No.: 830,055

[22] Filed: Feb. 3, 1992

[30] Foreign Application Priority Data

Mar. 18, 1991 [CA] Canada ................... 2038481

[51] Int. Cl.[5] .................. B29B 7/30; B29B 17/02
[52] U.S. Cl. ................... 264/349; 241/23;
241/65; 241/99; 241/DIG. 38; 264/37;
264/540; 264/102; 264/140; 264/211;
264/DIG. 69; 264/211; 264/23; 366/83;
366/91; 425/199; 425/202; 425/203; 425/532;
425/301; 425/DIG. 46
[58] Field of Search ........... 264/37, 140, 45.3, 122,
264/DIG. 69, 349, 177.2, 210.6, 211, 211.23,
102, 540; 425/297, 308, DIG. 46, 199, 202, 203,
532, 301; 100/93 RP; 241/99, 100.5, 65, 23, 152
A, DIG. 38; 366/83, 91

[56] References Cited

U.S. PATENT DOCUMENTS

| | | | |
|---|---|---|---|
| 3,687,873 | 8/1972 | Kropscott | 264/37 |
| 3,806,562 | 4/1974 | Lamort et al. | 264/140 |
| 4,138,534 | 2/1979 | Tedesco | 264/45.3 |
| 4,162,880 | 7/1979 | Cobbs, Jr. et al. | 264/DIG. 69 |
| 4,715,920 | 12/1987 | Ruppman et al. | 264/37 |
| 4,797,237 | 1/1989 | Hammer et al. | 264/DIG. 69 |
| 4,968,463 | 11/1990 | Levasseur | 264/DIG. 69 |

FOREIGN PATENT DOCUMENTS 57-31529  2/1982  Japan ................... 264/140

Primary Examiner—Jeffery Thurlow
Assistant Examiner—Mathieu Vargot
Attorney, Agent, or Firm—George A. Seaby

[57] ABSTRACT

In general, used thermoplastic liquid containers such as oil and solvent bottles are discarded. When recycling oil bottles, the usual practice is to wash the bottles with a solvent to remove oil therefrom. Washing of the bottles results in large quantities of used, oil-containing solvent, which present a disposal problem. A simple solution to the problem of recycling liquid containers with no preliminary washing or cleaning operation includes the steps of tumbling the bottles to promote liquid separation, shredding the bottles into small pieces and draining the liquid therefrom, grinding the pieces of plastic to yield a particulate thermoplastic, and mixing the particulate thermoplastic and any liquid remaining therein with an additive, e.g. an oil absorbent and a filler such as calcium carbonate, glass, mica or talc, and when the liquid is an oil, an absorbent to produce an extrudable mixture which can be used to form new containers.

19 Claims, 2 Drawing Sheets

BOTTLE RECYCLING APPARATUS AND METHOD

BACKGROUND OF THE INVENTION

1. Field of the Invention

This invention relates to a method and an apparatus for recycling used thermoplastic liquid containers.

2. Discussion of the Prior Art

It is well known that each year millions of thermoplastic liquid containers are used once and discarded. Attempts have been made to recycle such containers. Any such attempt involves the preliminary operation of washing the bottles. Washing of the bottles is labour intensive and consequently an expensive procedure. Moreover, when the liquid is oil, a solvent is used and the result is a large quantity of used, oil-containing solvent, which presents a disposal problem, i.e. another environmental headache.

GENERAL DESCRIPTION OF THE INVENTION

The object of the present invention is to provide an elegantly simple solution to the problem of recycling such containers in the form of an apparatus and a method which require, at most only limited separation of liquid form the used containers and no preliminary washing or cleaning operation.

According to one aspect, the invention relates to a method of recyling used thermoplastic containers having a liquid therein comprising the steps of:

(a) separating some of the liquid from the thermoplastic by draining the liquid in the absence of any solvent in inclined tumbler means having an oil reservoir at the bottom thereof for collecting oil separated from the containers, (b) grinding the containers to produce thermoplastic particles with residual liquid therein; and (c) mixing said particles and residual liquid with an additive necessary to yield an extrudable mixture capable of forming new containers.

According to another aspect, the invention relates to an apparatus for recycling thermoplastic containers having a liquid therein comprising:

(a) separator means for separating at least some of the liquid from the thermoplastic by draining in the absence of any solvent;

(b) grinder means for receiving the thermoplastic from the separator means and for grinding the thermoplastic to yield a particulate thermoplastic with residual liquid thereon; and (c) mixer means for receiving the thermoplastic from the grinder means and for mixing the thermoplastic and any residual liquid with an oil absorbent elastomeric additive to produce an extrudable mixture capable of forming a new container.

BRIEF DESCRIPTION OF THE DRAWINGS

The invention will be described in greater detail with reference to the accompanying drawings, which illustrate preferred embodiments of the invention, and wherein.

DESCRIPTION OF PREFERRED EMBODIMENT

It will be appreciated that while the preferred embodiments described herein are intended for use when recycling used oil containers, the same or similar apparatuses can be used for recycling containers for other liquids.

Figure 1:
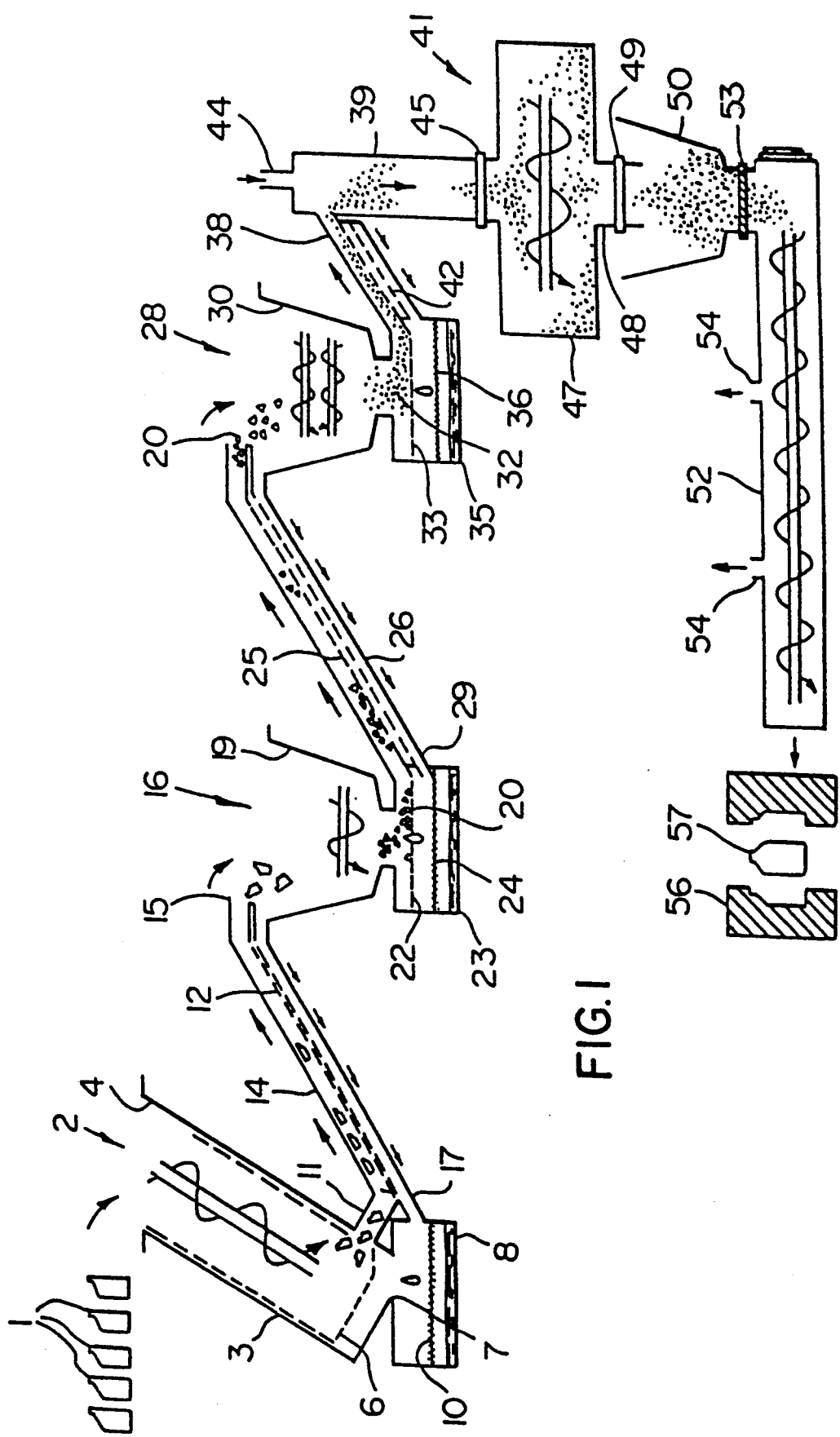
FIG. 1 is a schematic, longitudinal sectional view of one embodiment of the apparatus of the present invention.

With reference to FIG. 1, the following description relates to a version of the apparatus intended to recycle used thermoplastic oil containers in the form of bottles 1. The bottles in question are usually produced from high density polyethylene using conventional blow molding techniques. The caps (not shown) and some of the labels have been removed from the bottles 1. The bottles 1 are dumped into a tumbler generally indicated at 2. A suitable device for loading the tumbler 2 is a Tilter Model 1010 manufactured by Econolift. The tumbler 2 includes an inclined cylindrical casing 3 with an open top end 4 for receiving the bottles 1. A screen or sieve 6 is provided in the casing 3. The sieve 6, which has essentially the same shape as the casing 3, permits the passage of oil from the bottles 1 through an opening 7 in the bottom of the casing 3 into an oil reservoir 8. The oil reservoir 8 contains a filter 10 for filtering the oil for re-use. A drain (not shown) is provided in the reservoir 8 for discharging oil therefrom.

The bottles 1 pass through an inclined chute 11 proximate the bottom end of the tumbler 2 to a screen conveyor 12. The conveyor 12 is housed in a chute 14, which is inclined in a direction opposite to the chute 11. The bottles are discharged through the open top end 15 of the chute 14 into a shredder generally indicated at 6. A suitable shredder is a Model ST-40 Shredder available from Shred-Tech Ltd. Additional oil separating from the plastic during passage along the conveyor 12 falls to the bottom of the chute 14 and flows downwardly through an inlet 17 into the reservoir 8.

The shredder 16 is defined by an inverted frusto-conical hopper 19 containing blades (not shown) for cutting the bottles 1 into small pieces 20. The pieces 20 fall onto the horizontal conveyor 22 housed in a second oil reservoir 23 where additional oil is separated from the plastic, and passes through a filter 24 to the bottom of the reservoir 23. The plastic pieces 20 are discharged from the reservoir 23 to the bottom end of an inclined screen conveyor 25. The conveyor 25 is housed in a chute 26 which carries the bottle pieces 20 upwardly for discharge into a grinder generally indicated at 28. During passage through the chute 26, additional oil falls onto the chute bottom and flows through an inlet 29 into the reservoir 23.

A suitable grinder is Grinder Model HD-8 available from Foremost Machine Builder Inc. or Grinder Model 484A available from Cumberland Engineering. The grinder 28 is structurally similar to the shredder 16, including an inverted frusto-conical material receiving hopper 30 containing blades on rollers for grinding the plastic pieces 20 into smaller particles 32. The particles 32 fall onto a screen 33 in a third oil reservoir 35. Additional oil separates from the particles 32 and falls through the screen 33 and a filter 36 to the bottom of the reservoir 35.

Because heat reduces the viscosity of a liquid, heat can be applied during any step of the above described process. The tumbler 2, the shredder 6 and/or the grinder 18 are heated to reduce the viscosity of the oil, facilitating the separation of oil from the plastic.

The plastic particles and any remaining oil are fed through an inclined chute 38 to the inlet hopper 39 of a mixer generally indicated at 41, which may be a horizontal ribbon blender of the type available under Model 18-5000 from Plastic Machinery Inc. The chute 38 contains a screen conveyor 42 for draining any residual oil leaving the particles, the oil returning to the reservoir 35. An inlet 44 in the top of the hopper 39 facilitates the loading of additives into the particles.

If the plastic particles are polyethylene, and they are used with the residual oil to produce blow molded containers, the product will be too flexible, i.e. will not meet with the specifications required for such containers. Accordingly, at least two additives are mixed with the particles in the hopper 39. An oil absorbent such as ethylenepropylene diene (EPDM) rubber which is a terpolymer elastomer produced in several variations, EPR (ethylenepropylene rubber) or Kraton (trademark) is added to the particles to absorb any residual oil. An organic or inorganic filler such as calcium carbonate, glass, mica or talc is also added to the plastic particles to make any product produced from the plastic mixture more rigid. Pigments or dyes and other additives intended to enhance the final product in terms of permeability, finish, color and odour can be mixed with the plastic particles at this stage. Heat stabilizers (especially for stabilizing the oil) such as Irganox 1010 (trademark) and Par 24 (trademark) can also be added at this stage.

The shredded thermoplastic and oil could be mixed with fresh thermoplastic and a minimum of other additives to produce an extrudable plastic mixture. While the addition of unused thermoplastic partially defeats the purpose of recycling, the presence of such material reduces the quantities of other additives required to yield the desired product.

The resulting mixture falls through an annular row of magnets 45 for removing any metal from the mixture. Inevitably, during shredding and/or grinding of the bottles 1 some metal is chipped or otherwise removed from blades or rollers. The metal must be removed from the plastic prior to re-use. The mixture enters a mixer casing 47 where the thermoplastic is thoroughly mixed with the additives to produce a homogeneous mixture. The mixture is discharged through an outlet duct 48 carrying additional magnets 49 into the hopper 50 of an extruder 52. A final ring 53 of magnets is provided at the narrow bottom end of the hopper 50.

In the extruder 52, the mixture of recycled thermoplastic and other additives is melted. Vents 54 in the extruder 52 permit the escape of oil vapours. The mixture is extruded into a mold 56 to produce new bottles 57 by blow molding.

In the following description of the apparatus shown in FIG. 2, wherever possible the same reference numerals have been used to identify elements which are the same or similar to those of FIG. 1.

Figure 2:
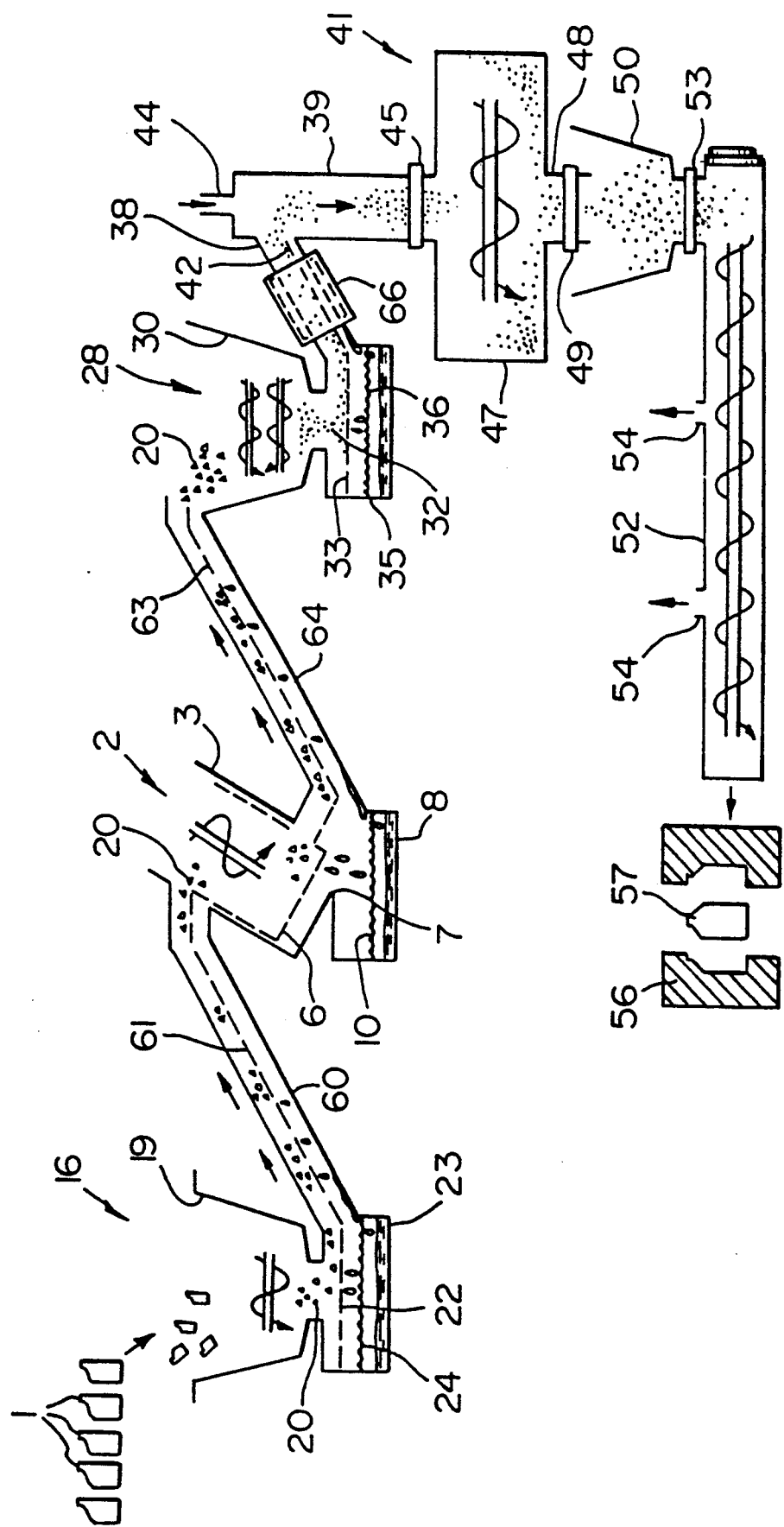
FIG. 2 is a schematic, longitudinal sectional view of a second embodiment of the apparatus of the present invention

Referring to FIG. 2, in a second embodiment of the invention, the first element of the apparatus receiving the bottles 1 is a shredder 16, which cuts the bottles 1 into small pieces 20 and initiates oil separation. The pieces 20 fall onto a screen 22, and oil separating therefrom falls through the screen and a filter 24 to the bottom of the reservoir 23. The pieces are fed upwardly through a chute 60 by a screen conveyor 61 to the top end of a tumbler 2. Oil separating from the pieces 20 on the conveyor 60 flows back down the chute to the reservoir 23.

The pieces 22 are tumbled in the tumbler 2 to promote oil separation. As in the apparatus of FIG. 1, the particles 32 fall onto a screen 33, and additional oil passes through the screen and a filter 36 to the bottom of a reservoir 35. The pieces 22 are then fed on a conveyor 63 through a chute 64 to the top end of a grinder 28. The grinder 28 yields thermoplastic particles 32 containing a small quantity of residual oil which is fed by a conveyor 42 through a chute 38 to the inlet hopper 39 of a mixer 41. A second tumbler 66 is provided in the chute 38 for separating additional residual oil from the thermoplastic particles. As is the case in the first embodiment of the invention, residual oil separated in the chute 38 or in the tumbler 66 flows into the reservoir 35. Following entry of the thermoplastic particles 32 into the hopper 39, the process is the same as described with reference to FIG. 1. Additives are introduced via the inlet tube 44, and the resulting mixture is fed through the mixer 47 into the extruder 52. Any metal particles in the plastic are removed by the magnets 45 and 49 upstream and downstream, respectively of the mixer 41.

The thus produced mixture is extruded into a mol for forming a new plastic bottle 57. Of course, the cycle can be repeated, i.e. the bottle produced by the above-identified method can also be recycled.

When the bottles originally contain liquids such as, e.g. automotive windshield or other solvents, or oil, the separation step using the tumbler and/or screen conveyors can be omitted. In such cases, it is often merely necessary to grind the containers, mix the ground plastic with a filler such as talc or calcium carbonate, and pass the particulate mixture through a vented extruder.

We claim:

1. A method of recycling used thermoplastic containers having a liquid therein comprising the steps of:
   (a) separating some of the liquid from the thermoplastic by draining the liquid in the absence of any solvent in inclined tumbler means having an oil reservoir at the bottom thereof for collecting oil separated from the containers;
   (b) grinding the containers to produce thermoplastic particles with residual liquid therein; and
   (c) mixing said particles and residual liquid with an oil absorbent elastomeric additive necessary to absorb any residual oil and yield an extrudable mixture capable of forming new containers.

2. A method according to claim 1, wherein the separation of liquid from the containers is affected by tumbling the containers during draining, whereby to promote separation of liquid therefrom.

3. A method according to claim 2, wherein the separation of liquid from the containers includes the step of heating the containers and liquid during tumbling.

4. A method according to claim 3, including the step of conveying the containers along an upwardly inclined path of travel between the separating and grinding steps.

5. A method according to claim 2, including the step of shredding the containers between the tumbling and grinding steps to facilitate the separation of liquid from the containers.

6. A method according to claim 1, wherein a filler selected form the group consisting of calcium carbonate, glass, mica and talc is added to the thermoplastic particles.

7. A method according to claim 1, wherein the oil absorbent additive is selected from the group consisting of ethylenepropylene diene rubber and ethylenepropylene rubber; and a filler selected from the group consisting of calcium carbonate, glass, mica and talc is added to the thermoplastic particles.

8. A method according to claim 1, including the steps of shredding the thermoplastic containers before separating liquid therefrom, and tumbling the shredded thermoplastic during draining.

9. A method according to claim 8, including a second tumbling step following grinding and preceding mixing of the particles with the additive.

10. A method according to claim 8, including the step of heating the containers during at least one of the tumbling, grinding and shredding steps to facilitate liquid separation.

11. A method according to claim 8, wherein the oil absorbent additive is selected from the group consisting of ethylenepropylene diene rubber and ethylenepropylene rubber; and a filler selected from the group consisting of calcium carbonate, glass, mica and talc is added to the thermoplastic particles.

12. An apparatus for recycling thermoplastic containers having a liquid therein comprising:
   (a) separator means for separating at least some of the liquid from the thermoplastic by draining in the absence of any solvent including tumbler means having an oil reservoir at the bottom thereof for collecting oil separated from the containers;
   (b) grinder means for receiving the thermoplastic from the separator means and for grinding the thermoplastic to yield a particulate thermoplastic with residual liquid therein; and
   (c) mixer means for receiving the thermoplastic from the grinder means and for mixing the thermoplastic and any residual liquid with an oil absorbent elastomeric additive to absorb any residual oil and produce an extrudable mixture capable of forming a new container.

13. An apparatus according to claim 11, wherein said separator means includes shredder means for receiving containers from said tumbler means and for shredding the containers into small pieces.

14. An apparatus according to claim 11, including heater means for heating the liquid during separation to reduce the viscosity of the liquid, whereby separation is facilitated.

15. An apparatus according to claim 13, including first inclined, screen conveyor means for carrying the containers from the tumbler means to said shredder means while draining liquid from the container means; second inclined screen conveyor means for carrying the shredded thermoplastic from the shredder means to the grinder means while draining liquid therefrom; and third inclined, screen conveyor means for carrying the particulate thermoplastic from said grinder means to said mixer means.

16. An apparatus according to claim 11, wherein said separator means includes shredder means for shredding containers into small pieces; and first tumbler means for receiving said pieces of container from said shredder means to facilitate the separation of liquid therefrom.

17. An apparatus according to claim 16, including first inclined, screen conveyor means for carrying said pieces of container from said shredder means to said first tumbler means while draining liquid from the shredded thermoplastic; second inclined, screen conveyor means for carrying the tumbled pieces of container from said first tumbler means to said grinder means; and third inclined, screen conveyor means for carrying the particulate thermoplastic from said grinder means to said mixer means.

18. An apparatus according to claim 17, including second tumbler means on said third inclined, screen conveyor means for facilitating separation of liquid from the particulate thermoplastic.

19. An apparatus according to claim 15 including heater means for heating the liquid during separation to reduce the viscosity thereof, whereby separation is facilitated.

* * * * *